(12) United States Patent
Ayestarán Lazcano et al.

(10) Patent No.: US 10,668,589 B2
(45) Date of Patent: Jun. 2, 2020

(54) MACHINE TOOL

(75) Inventors: Francisco Ayestarán Lazcano, Elgoibar (ES); Jorge Ibarra Garcés, Elgoibar (ES); Ibon Iribarren Aristizabal, Elgoibar (ES)

(73) Assignee: ETXE-TAR, S.A., Elgoibar (Guipuzcoa) (ES)

(*) Notice: Subject to any disclaimer, the term of this patent is extended or adjusted under 35 U.S.C. 154(b) by 832 days.

(21) Appl. No.: 14/419,639

(22) PCT Filed: Aug. 6, 2012

(86) PCT No.: PCT/ES2012/070609
§ 371 (c)(1),
(2), (4) Date: Jun. 15, 2015

(87) PCT Pub. No.: WO2014/023855
PCT Pub. Date: Feb. 13, 2014

(65) Prior Publication Data
US 2015/0298274 A1   Oct. 22, 2015

(51) Int. Cl.
B23Q 39/02 (2006.01)
B23B 39/18 (2006.01)
B23Q 39/00 (2006.01)

(52) U.S. Cl.
CPC ............ B23Q 39/028 (2013.01); B23B 39/18 (2013.01); B23Q 39/024 (2013.01);
(Continued)

(58) Field of Classification Search
CPC .. B23Q 39/021; B23Q 39/022; B23Q 39/024; B23Q 39/04; B23Q 39/18;
(Continued)

(56) References Cited

U.S. PATENT DOCUMENTS 2,614,446 A * 10/1952 Miller ...................... B23B 3/30
                                                  279/158
5,781,983 A   7/1998 Guner
(Continued)

FOREIGN PATENT DOCUMENTS

CN    1155864    7/1997
CN    1498717    5/2004
(Continued)

OTHER PUBLICATIONS

Office Action, Russia patent application No. 2015103841/02, Russian Patent Office, dated Jul. 14, 2016, 10 pages.
(Continued)

Primary Examiner — Sunil K Singh
Assistant Examiner — Michael Vitale

(57) ABSTRACT

Machine tool, comprising
at least two workpiece carrier assemblies (11), each including a workpiece carrier (12), said workpiece carrier assemblies (11) being supported on respective workpiece carrier support (1) for horizontal movement in a first direction in parallel with a horizontal Z axis;
at least a first tool carrier (21), supported on a tool carrier support (2) for horizontal movement in a second direction, said first tool carrier (21) being displaceable in said second direction between at least one operative position (A) in which said first tool carrier (21) is facing one of said workpiece carrier assemblies (11), and at least one inoperative position in which said first tool carrier (21) is not facing any workpiece carrier assembly (11).
The invention also relates to a method of machining a connecting rod using the machine tool.

16 Claims, 7 Drawing Sheets

(52) U.S. Cl.
CPC ... *B23Q 2039/006* (2013.01); *Y10T 29/49288* (2015.01); *Y10T 29/5107* (2015.01); *Y10T 409/308344* (2015.01); *Y10T 409/308568* (2015.01)

(58) Field of Classification Search
CPC ........ B23Q 2039/002; B23Q 2039/006; B23B 39/18; B23P 2700/04; Y10T 29/5105; Y10T 29/5107; Y10T 409/307168; Y10T 409/307784; Y10T 409/308344; Y10T 409/308568
USPC ........ 409/192, 203, 213, 217; 29/26 A, 26 R
See application file for complete search history.

(56) References Cited

U.S. PATENT DOCUMENTS

| | | | |
|---|---|---|---|
| 5,908,270 A * | 6/1999 | Araki | B23Q 11/0039 408/1 R |
| 6,949,056 B2 | 9/2005 | Soroka et al. | |
| 7,442,154 B2 | 10/2008 | Boehler et al. | |
| 8,210,907 B2 | 7/2012 | Walter et al. | |
| 2004/0154157 A1 | 8/2004 | Hesbruggen et al. | |
| 2009/0082184 A1 | 3/2009 | Grossmann | |
| 2010/0054887 A1 | 3/2010 | Chen | |
| 2010/0205800 A1 * | 8/2010 | Benz | B23Q 1/626 483/44 |
| 2011/0131791 A1 | 6/2011 | Haas et al. | |
| 2011/0173788 A1 * | 7/2011 | Stanik | B21H 3/04 29/27 A |

FOREIGN PATENT DOCUMENTS

| | | | | |
|---|---|---|---|---|
| CN | 101815597 | | 8/2010 | |
| DE | 2852875 A1 | * | 6/1980 | ........... B23B 39/161 |
| DE | 102006021946 A1 | * | 11/2007 | ........... B23Q 39/024 |
| DE | 102006026186 | | 12/2007 | |
| DE | 102006048495 A1 | * | 4/2008 | ........... B23Q 39/024 |
| DE | 102008014779 | | 9/2009 | |
| EP | 0 873 817 | | 10/1998 | |
| EP | 1 002 620 | | 5/2000 | |
| EP | 1992449 | | 11/2008 | |
| GB | 2167325 A | * | 5/1986 | ......... B23Q 3/15526 |
| JP | WO 2011118338 A1 | * | 9/2011 | ............... B23B 3/30 |
| RU | 2022759 | | 11/1994 | |
| RU | 2080974 | | 6/1997 | |
| SU | 1625664 | | 2/1991 | |
| WO | WO 2008/089751 | | 1/2008 | |

OTHER PUBLICATIONS

Notification of the First Office Action, Chinese patent application No. 2012800751739, Chinese Patent Office, dated Apr. 1, 2016, 25 pages.

European Patent Office, European Patent Application No. 12 787 035.0, Office Action dated Jul. 17, 2018, 5 pages.

* cited by examiner

MACHINE TOOL

FIELD OF THE INVENTION

The invention is related to the field of machine tools.

STATE OF THE ART

Machine tools are used for machining workpieces, such as work pieces of metal, to provide them with the desired shape and configuration, for example, by drilling or boring holes in the workpieces and/or by machining edges to give them a desired, for example, a bevelled, shape. For example, the machining of a connecting rod for connecting the piston to the crankshaft of a reciprocating piston engine involves several different operations which can be performed in one machine tool or sequentially in different machine tools, which can be different or which can have the same basic design but being equipped with different tools, adapted to performing the specific operations. For example, machining this kind of connecting rod can typically include several or all of the following steps:

rough grinding of the surfaces of the blank
    rough boring of the pin hole and the crank hole
    machining bolt holes and seats
    cracking the connecting rod (body and cap) and bolts assembly
    finish grinding of the surfaces
    milling trapezoid and semifinishing crank hole
    finish boring pin hole and crank hole.

For example, FIGS. 1A-1D show how some of these operations can be carried out on a connecting rod blank 1000 by using different tools 100, 101, 102, 103 which can be connected to respective spindle heads to be driven by a spindle, for rotary movement about, for example, a horizontal Z axis (not illustrated in FIG. 1), in a conventional manner. For example, FIG. 1A shows boring of the pin hole with a first tool 100, FIG. 1B shows the machining of bolt holes using a second tool 101, FIG. 1C shows the milling of a trapezoidal end of the blank using a third tool 102, and FIG. 1D shows boring of the crank hole using a fourth tool 103. All of these steps can be carried out by one machine tool, in which the different tools are mounted simultaneously or sequentially. It is, of course, also possible to carry out different steps using different machine tools.

Machines of this type are normally provided with some kind of tool carrier, in which the tools can be replaced depending on the task to be performed by the machine at a certain time or for a certain period. In this specification, the term "tool" is to be interpreted in a generic sense, and can, but must not, include an associated spindle head.

Machine tools for performing machining operations such as drilling and milling, for example, by rotary motion of a tool, for example, for shaping and boring connecting rods for reciprocating piston engines, are well known in the art, and it is thus not considered necessary to describe the operation of a tool drive or of a tool holding mechanism, as the skilled person is aware of how to design this kind of equipment and as appropriate devices are commercially available.

Machine tools are conventionally numerically controlled and in machine tools with rotary tools, machining is performed by producing a controlled relative movement between the workpiece and the corresponding tool. For example, it is known to provide a machine with one or more fixed tools, and to move one or more workpieces, such as a workpiece or blank out of which a connecting rod is to be obtained, in relation to the fixed tool, for example, in parallel with a horizontal Z axis (the Z axis can be the axis around which a tool rotates, or an axis parallel with that axis), in parallel with an X axis which can be a horizontal axis perpendicular to the Z axis, and in parallel with a Y axis which can be a vertical axis.

U.S. Pat. No. 7,442,154 discloses a machine tool comprising a frame in which tools can be mounted in tool carriers, which can be tool spindles. Different tools can be applied at different heights of the frame. A workpiece carrier is provided which can move a workpiece in three different, orthogonal, directions, that is, in a vertical "Y" direction and in two perpendicular horizontal directions, referred to as "X" and "Z". The workpiece carrier can also be rotated around the "Z" axis.

Another example of this kind of machine is known from WO-A-2008/089751, which discloses a machine tool based on a reticular frame structure, in which tools can be fixed. The machine tool includes a workpiece carrier which can be displaced along an X-Y-Z guide.

In both of these machines, the tool carriers are arranged in an overhanging manner, cf., for example, FIG. 1 of U.S. Pat. No. 7,442,154 and FIG. 12 of WO-A-2008/089751. It is believed that this can, at least in some cases, be a problem, for example, when substantive forces are exerted on the tool carrier, which may occur, for example, when machining connecting rods. Thus, attention must be paid to the resistance and rigidity of the work piece carrier (including the structure for guiding it), that is, for example, the resistance and rigidity of the quill shown in WO-A-2008/089751.

Also, it is observed that when replacing the tools in the machine of U.S. Pat. No. 7,442,154, the operator must access the space within the tool holding frame. Similarly, when replacing the tools in a machine tool as known from WO-A-2008/089751, the operator will need to access the space within the reticular frame. However, this space is limited, inter alia due to the presence of the quill and tools.

Similar problems appear to apply when accessing the workpiece carrier for replacing workpieces, or for replacing the workpiece carrier itself, or parts thereof.

At least some of these problems can be even more serious when the tools and/or work piece carrier are placed high up. In the machines known from U.S. Pat. No. 7,442,154 and WO-A-2008/089751, flexibility can be enhanced by incorporating different kinds of tools into the frame, these tools being distributed in the vertical direction of the frame. This can, however, imply that at least some of the tools may be placed at a substantial height over the surface on which an operator will stand when manipulating, for example, the tools during a tool maintenance or replacement process, and/or that at least some of the tools may be placed very low. In both cases, the operator may have to adopt an ergonomically unfavourable position when manipulating the tools.

DE-A-10 2008 014 779 discloses a machine tool in which a tool carrier is laterally displaceable between a position in which it is in front of a workpiece carrier, and a position in which it can receive tools from a tool magazine.

It is often desirable to increase the productivity of this kind of equipment. This can be done by, for example, increasing the capacity of the tool carriers so as to increase the number of tools carried by each tool carrier, for example, by adding more tools in each row, or by increasing the number of rows, thereby increasing the vertical extension of the tool carriers. However, this is not always desirable, for example, for ergonomic reasons.

Frequently, rotatory transfer solutions are used: a plurality of workpiece carriers are arranged on a rotatory support, and a corresponding number of tool carriers are arranged around the support, facing the respective workpiece carriers. The support rotates so that each workpiece carrier is transferred from facing one tool carrier to facing the next tool carrier, and the tools carried by these tool carriers are operated to carry out the different operations on the workpieces facing them. This arrangement can provide for high productivity, but has drawbacks in what regards ergonomics and flexibility. For example, when a new type of workpiece is to be machined, the entire set of workpiece carriers needs to be replaced. Also, access to the tool carriers for replacing the tools can be complicated, as access may only be possible from the side, which can be a serious drawback from an ergonomic point of view. Thus, reconfiguring the machine tool for a new kind of product can be complicated and time-consuming.

Further, in this kind of machines, there is a tendency for metal shavings to accumulate on tools and/or on the platform below the tools, something that can have a negative impact on the operation of the equipment.

DESCRIPTION OF THE INVENTION

A first aspect of the invention relates to a machine tool, comprising:

at least two workpiece carrier assemblies (each one comprising or consisting of, for example, a structurally stable, resistant and/or rigid carriage), each including a workpiece carrier for supporting at least one workpiece (the workpiece carrier assembly can be, for example, a structure such as a metal structure arranged to provide for sufficient stability and rigidity to substantially avoid undesired movement of the workpiece carrier and the workpieces during machining; each workpiece carrier can be arranged for supporting a plurality of worpieces, for example, 4-8 workpieces);

at least two workpiece carrier supports, each workpiece carrier assembly being supported on a respective one of said workpiece carrier supports for horizontal movement in a first direction on said respective workpiece carrier support, said first direction being parallel with a horizontal Z axis;

at least a first tool carrier configured for carrying at least one tool for machining at least one workpiece by rotating said tool around an axis parallel with said Z axis (the tool carrier can typically incorporate one or more spindles and spindle heads arranged to rotate one or more tools);

a tool carrier support, said first tool carrier being supported on said tool carrier support for horizontal movement in a second direction on said tool carrier support, said second direction being parallel with a horizontal X axis, said X axis being perpendicular to said Z axis (that is, for example, the workpiece carrier assemblies with the workpiece carriers can be considered to be moveable backwards and forwards along the workpiece carrier supports, whereas the tool carrier can be considered to be moveable in a lateral direction along the tool carrier support);

said first tool carrier being displaceable on said tool carrier support in said second direction between at least one operative position in which said first tool carrier is facing one of said workpiece carrier assemblies (so that when the machine is operating, one or more tools carried by said first tool carrier can interact with one or more workpieces carried by the respective workpiece carrier, for machining of the workpieces by movement of the workpiece carrier and/or the tool or tools), and at least one inoperative position in which said first tool carrier is not facing a workpiece carrier assembly (the term "between" should not be interpreted to imply that said at least one operative position and said at least one inoperative position are necessarily end positions, but merely implies that the first tool carrier can be displaced from the inoperative position to the operative one, and vice-versa; for example, in some embodiments of the invention, there can be at least two operative positions separated by at least one inoperative position, so that the tool carrier can be displaced from one operative position to an inoperative position and then continue to the next operative position).

Thus, when the first tool carrier is not facing a workpiece carrier assembly but is, basically, laterally offset with regard to said workpiece carrier assemblies, it is easy to replace tools also at the front end of the first tool carrier (that is, at the end that is facing the respective workpiece carrier assembly when the first tool carrier is in the operative position). That is, an operator can access the tools from the front without having to enter or access the space between the workpiece carrier assembly and the tool carrier. Thus, the arrangement provides for ergonomy and flexibility. Also, the fact that the tool carrier is displaceable in the lateral direction further provides for flexibility in production, as several tool carriers can be provided which selectively can be brought to the operative position, depending on the specific machining operations that are to be carried out. On the other hand, the use of at least two workpiece carrier assemblies enhances flexibility and productivity: for example, one tool carrier can sequentially interact with one of said workpiece carrier assemblies and the other one of said workpiece carrier assemblies, whereby loading of one of said workpiece carrier assemblies with workpieces can, for example, be performed while the tools of the tool carrier are machining the workpieces loaded in the workpiece carrier of the other workpiece carrier assembly. Also, or alternatively, different operations can be performed on the workpieces mounted in the different workpiece carrier assemblies, and workpieces can be transferred from one of the workpiece carrier assemblies to another one of said workpiece carrier assemblies. One or more robots or manipulators can be provided for transferring workpieces from one of the workpiece carrier assemblies to the other one, and/or for loading and unloading the workpieces onto/from the workpiece carrier assemblies, for example, for unloading and then loading one of said workpiece carrier assemblies while the tools of a tool carrier are operating on the workpieces in the other workpiece carrier assembly. Thus, productivity can be optimised. Also, with an adequate number of tool carriers and workpiece carrier assemblies, the risk for (or the consequences of) standstills due to problems with one single tool carrier or workpiece carrier assembly can be substantially reduced. The concept described above can be implemented in many different ways, depending on the specific needs of each potential user. The fact that both the tool carrier and the workpiece carrier assemblies are moveable on respective supports provides for stability and rigidity. This can be especially desirable in connection with the machining of connecting rods, as this kind of machining implies that large forces are exerted on the workpieces, and the manufacturing tolerances are often very small. Also, the structural stability of this kind of workpieces is often small. Thus, stability and rigidity of the components involved in the machining, including tools, tool carriers and workpiece carrier, are important.

The first tool carrier can further be displaceable between said operative position in which said first tool carrier is facing one of said workpiece carrier assemblies, and at least another operative position in which said first tool carrier is facing another one of said workpiece carrier assemblies.

That is, the same tool carrier can be used for sequentially operating on workpieces in two different workpiece carrier assemblies, and can further be displaced to the inoperative position when, for example, there is a need to replace one or more tools.

The machine tool can further comprise a second tool carrier, said second tool carrier being configured for carrying at least one tool for machining at least one workpiece by rotating said tool around an axis parallel with said Z axis, said second tool carrier being supported on said tool carrier support for horizontal movement in the second direction, between an operative position in which said second tool carrier is facing one of said workpiece carrier assemblies, and an inoperative position in which said second tool carrier is not facing said workpiece carrier assembly.

By using two (or more) separate tool carriers that can be selectively moved between their operative position (or positions) and their inoperative position (or positions), several additional advantages can be obtained. Not only does the inoperative position allow for more flexibility and easy access for replacement of tools, but the fact that there are two (or more) tool carriers implies that one of them can be used for machining, while maintenance and/or replacement of tools can be carried out on the other(s).

Also, the use of a plurality of tool carriers, such as two or more tool carriers, provide for the possibility of having a relatively large variety of tools ready for use (that is, mounted on a respective tool carrier), without any need for arranging the tools over a large range in the vertical direction. For example, assuming that each tool carrier has, for example, N (for example, 2) rows of tools each comprising, for example, M (for example, 4) tools, the first and the second tool carrier together can hold 2×N×M (for example, 16) tools. Thus, for example, at any given moment the two (2) tool carriers together can hold two (2) different sets of N×M tools, or four (4) different sets of N×M/2 tools, distributed along only N rows (for example, two (2) rows) in the vertical direction. That is, due to the lateral movement of the tool carriers, a high variety of tools can be mounted "ready for use" in the different tool carriers, while maintaining the tools within a relatively short extension in the vertical direction. This can be advantageous as it implies that all of the tools can be arranged at a height at which manipulation of the tools, for example, replacement of tools, can be carried out by the operator under ergonomic conditions, for example, without having to bend over excessively, and/or without having to climb ladders or similar.

The workpiece carrier supports can extend towards respective side portions of the tool carrier support, and the tool carrier support can further comprise a central portion, whereby the inoperative position can correspond to said central portion, and wherein the operative positions can correspond to the side portions. In this way, by simply shifting a tool carrier to the central portion of the tool carrier support, one set of tools can be replaced by another set of tools during operation of the machine. For example, after termination of a certain cycle of machining, the tool carrier can be shifted sideways to its inoperative position. This configuration has been found to be practical and allows for a flexible use of the tool carriers, while the total amount of space that is needed is rather limited. The entire length of the tool carrier support, when one or two tool carriers are used, can be limited to approximately three times the width of each tool carrier, so as to accommodate for the two operative positions and the inoperative position.

The workpiece carrier supports and the tool carrier support can, together, have, for example, a U or an F configuration, when viewed from above.

Alternatively, the workpiece carrier supports can extend towards respective intermediate portions of the tool carrier support, and the tool carrier support can further comprise a central portions and two side portions, said side portions being separated from said central portion by said intermediate portions, whereby the operative positions can correspond to said intermediate portions, and wherein the inoperative positions can correspond to the side portions and the central portion. This can provide for further enhanced flexibility; for example, if there are two tool carriers, each of them can interact with each of the workpiece carrier assemblies, by displacing the other tool carrier to the respective side or end portion of the tool carrier support, whenever necessary.

The machine tool can further comprise at least a third workpiece carrier assembly including a third workpiece carrier for supporting at least one workpiece, and at least a third workpiece carrier support, said third workpiece carrier assembly being supported on said third workpiece carrier support for horizontal movement in said first direction on said third workpiece carrier support. The use of a third workpiece carrier assembly can help to even further enhance productivity and flexibility. The workpiece carrier supports can extend towards two side portions and one central portion of the tool carrier support, respectively, and the tool carrier support can further comprise two intermediate portions positioned between said central portion and a respective one of said side portions, so that said side portions are separated from said central portion by said intermediate portions, whereby at least some of the inoperative positions correspond to said intermediate portions, and wherein the operative positions correspond to the side portions and the central portion. Optionally, the machine tool can additionally comprise at least a third tool carrier displaceable in said second direction, between at least one operative position and at least one inoperative position. With the three workpiece carrier supports, the workpiece carrier supports and the tool carrier support (or part of it) can, together, have an E configuration, when viewed from above. Obviously, the machine tool can comprise further workpiece carrier supports arranged along the tool carrier support.

In one possible implementation of the invention, all of the tools, when mounted in the respective tool carrier, can be placed at a height of not less than 0.7 m, preferably not less than 1.1 m, and not more than 1.8 m, preferably not more than 1.5 m, over a floor or similar, said floor being a floor on which an operator walks when servicing the machine tool, for example, by replacing the tools mounted in the tool carriers. In this way, the operator can manipulate the tools while adopting a comfortable and ergonomically correct position, and without any need for climbing ladders or similar.

Said first tool carrier can comprise N rows of tools, $1 \leq N \leq 5$, for example, N=2 or N=3 or N=4. By using a rather low number of rows, all of the tools can be kept at a height that allow easy manipulation of the tools by an operator.

The workpiece carrier can be mounted on the respective workpiece carrier assembly so that the workpiece carrier is displaceable in the vertical direction, that is, in parallel with a vertical Y axis. In this way, by the arrangement described so far, relative movement between tools and workpieces is provided along the Z, X and Y axes.

Obviously, additional degrees of freedom, such as, for example, rotation of the workpiece carrier around an axis, such as around an axis parallel with the Z axis, is not excluded from the scope of the present invention.

The workpiece carrier supports and the tool carrier support can be placed on a floor or similar support surface, and can be arranged to support the workpiece carrier assembly and the tool carriers from below. It can sometimes be preferred that none of the tool carriers or the workpiece carrier assembly hang from overhead supports; the use of simple ground supports placed on the floor can be preferred, for example, due to simplicity of installation.

The workpiece carrier supports and the tool carrier support can have a height of not more than 1.1 m, preferably not more than 0.6 m. In this way, the tool carriers can be placed relatively low, facilitating access to the tools.

The machine tool can be a machine tool for machining connecting rods for a reciprocating piston engine, preferably a reciprocating piston engine of an automobile or a truck. The machining of connecting rods for a reciprocating piston engine, such as a reciprocating piston engine of an internal combustion motor of an automobile or a truck, is a task that involves certain specific considerations, and for which, traditionally, rather specific machines have been used. The machine tool of the present invention can involve advantages in terms of stability and rigidity, as explained above.

Another aspect of the invention relates to a method for machining connecting rods for a reciprocating piston engine, such as a reciprocating piston engine of an automobile or a truck. The method comprises subjecting a rod blank to a plurality of machining steps, wherein at least one of said machining steps is carried out by a machine tool as described above. For example, a plurality of said machining steps can carried out by the same machine tool. In one possible implementation of the invention, between at least two of said machining steps, the first tool carrier is switched from its operative position to its inoperative position, or from its inoperative position to its operative position. If there is a second tool carrier, this second tool carrier can be shifted in a corresponding manner. For example, for machining a connecting rod, tools mounted on the first tool carrier can be used for one or more of the machining steps, and tools mounted on the second tool carrier can be used for one or more further machining steps.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be embodied. The drawings comprise the following figures.

DESCRIPTION OF AN EMBODIMENT OF THE INVENTION

Figure 1A:
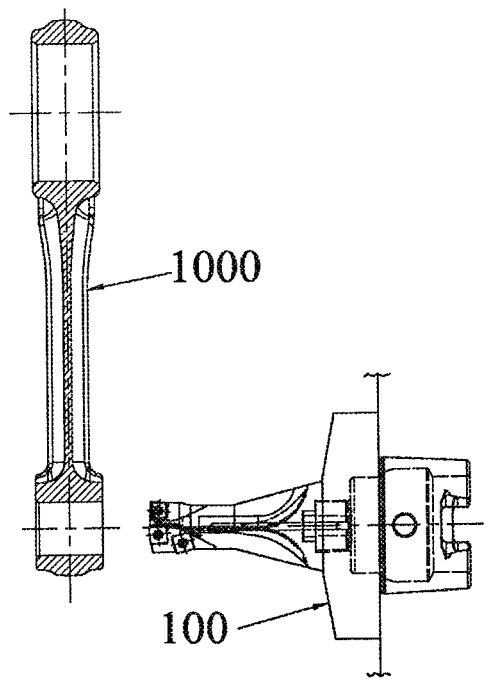
FIGS. 1A-1D schematically illustrate some operations which can be carried out when machining a connecting rod out of a rod blank, involving the use of different tools.
Figure 1B:
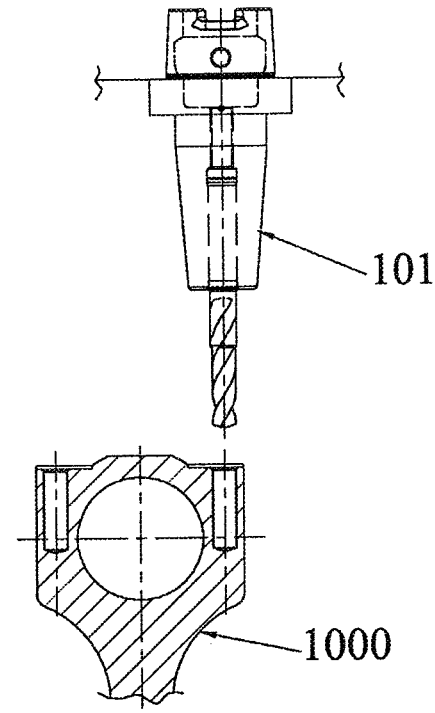
Figure 1C:
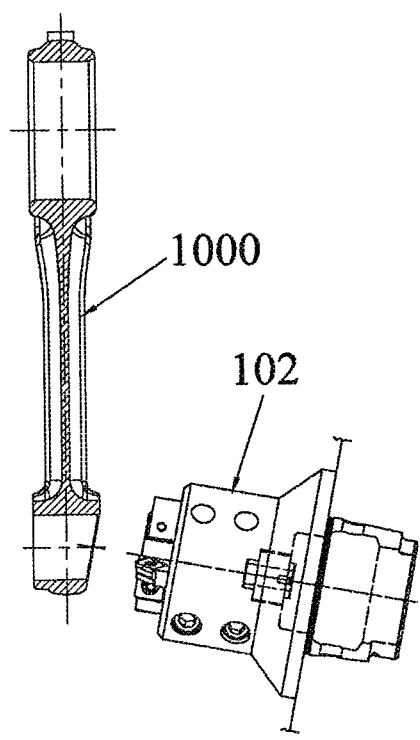
Figure 1D:
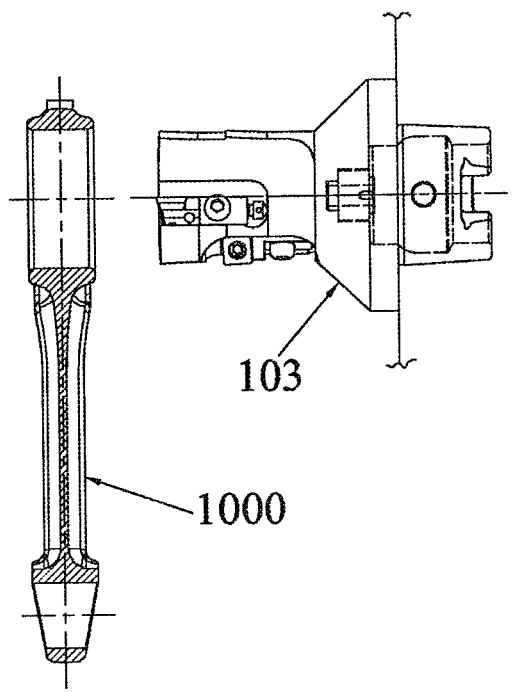
Figure 2A:
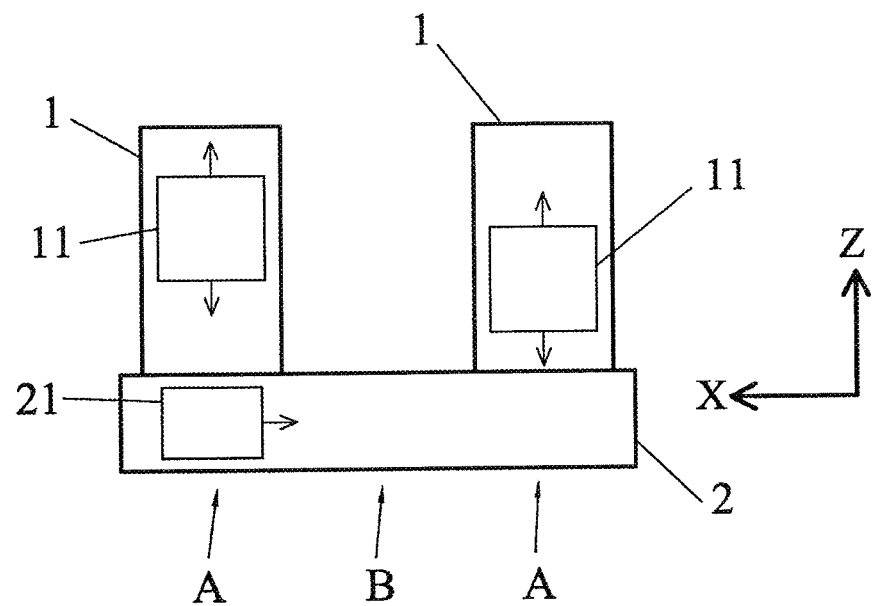
FIGS. 2A-2D are schematic views from above, illustrating different possible layouts of a machine tool in accordance with the invention.

FIG. 2A schematically illustrates the layout of the machine tool in accordance with a first embodiment of the invention. Here, the two workpiece carrier supports 1 extend in parallel towards respective ends of the tool carrier support 2, in a "U" configuration. A workpiece carrier assembly 11 is mounted on each of said workpiece carrier supports, for movement in the Z direction. The machine tool comprises one single tool carrier 21, displaceable along the tool carrier support in the X direction, perpendicular to the Z direction. It can be observed how this tool carrier can be displaced between two operative positions A, in which the tool carrier faces a respective workpiece carrier assembly (so as to be able to operate on the respective workpieces), and an intermediate inoperative position, where an operator can easily replace the tools and carry out other maintenance tasks related to the tool carrier. In this way, the tool carrier can be switched between the different operative positions, so as to operate on the workpieces in one of the workpiece carrier assemblies, while, for example, unloading and/or loading of workpieces takes place in the other workpiece carrier assembly.

Figure 2B:
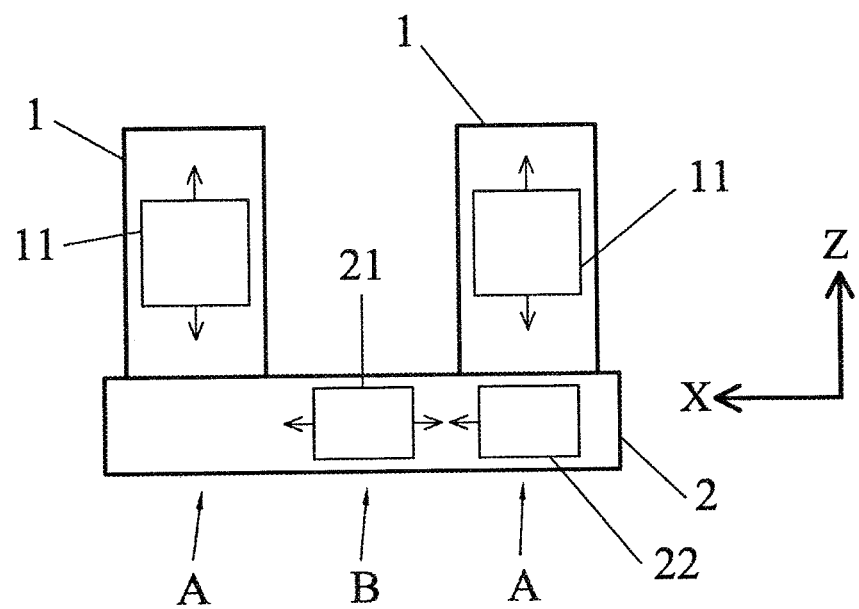

FIG. 2B illustrates an arrangement which differs from the one of FIG. 2A in that there is a second tool carrier 22. In this arrangement, productivity can be enhanced as machining of workpieces can take place simultaneously in the two workpiece carrier assemblies.

Figure 2C:
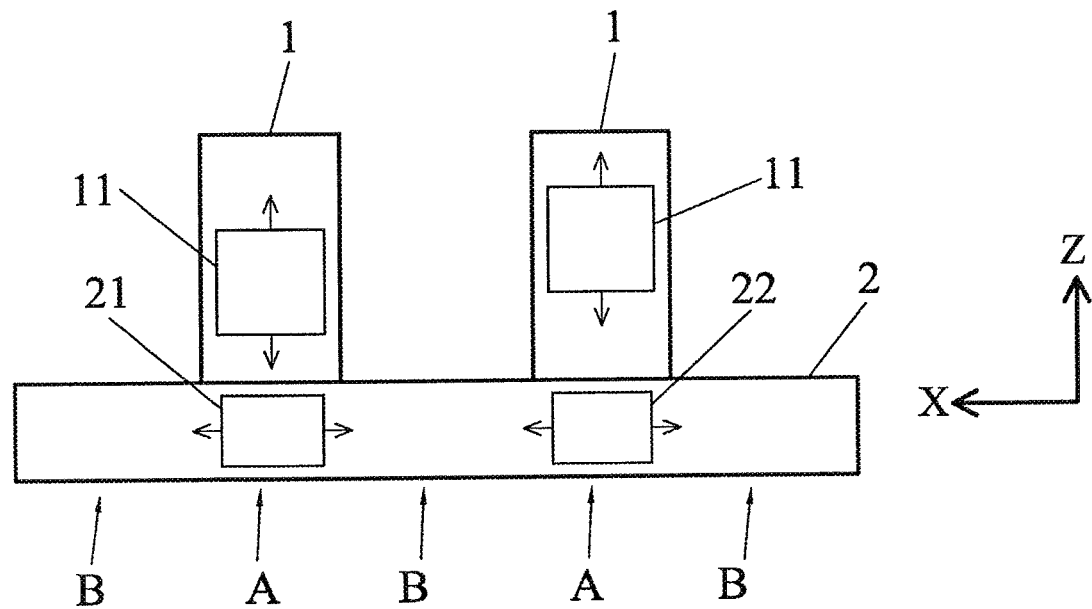

FIG. 2C illustrates an alternative arrangement in which the tool carrier support 2 has been extended to provide for inoperative positions B at the side or end portions as well as at a central portion of the tool carrier support, and for operative positions A at two intermediate portions. This implies an advantage at least in terms of flexibility, if compared to the embodiment of FIG. 2B: in the embodiment of FIG. 2C, each one of the two tool carriers 21, 22 can be positioned before each one of the two workpiece carrier assemblies 11. This is not only an advantage in terms of flexibility, but also allows operation on both of the workpiece carrier assemblies to continue, should there be a failure in one of the tool carrier assemblies: the defective tool carrier assembly is simply shifted to the inoperative position B at the end of the tool carrier support 2, and the remaining tool carrier is then shifted between the two operative positions A.

Figure 2D:
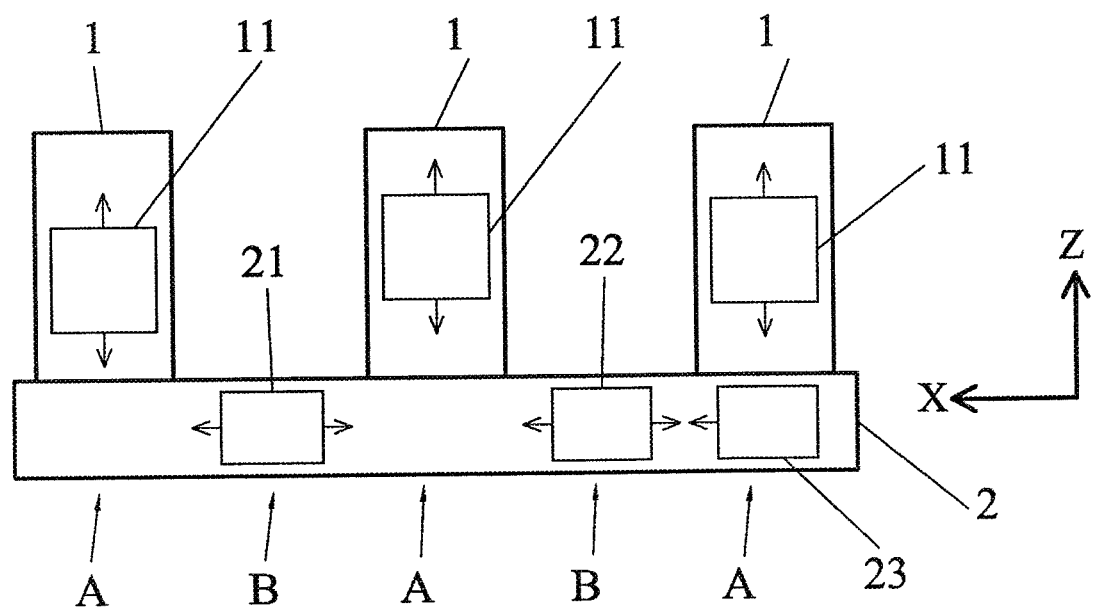

FIG. 2D illustrates a further embodiment, with an "E"-shaped layout. Here, there are three workpiece carrier assemblies 11 on respective workpiece carrier supports 1, and three tool carriers 21, 22, 23. This can further enhance productivity.

Obviously, there are endless alternatives. For example, the embodiment of FIG. 2D can be modified by removing one of the workpiece carrier assemblies 11 and supports 1, providing for an "F"-shaped layout. Or the tool carrier support can be further extended, to provide for additional inoperative positions at its ends. Further workpiece carrier supports can be added, whenever desired.

Figure 3:
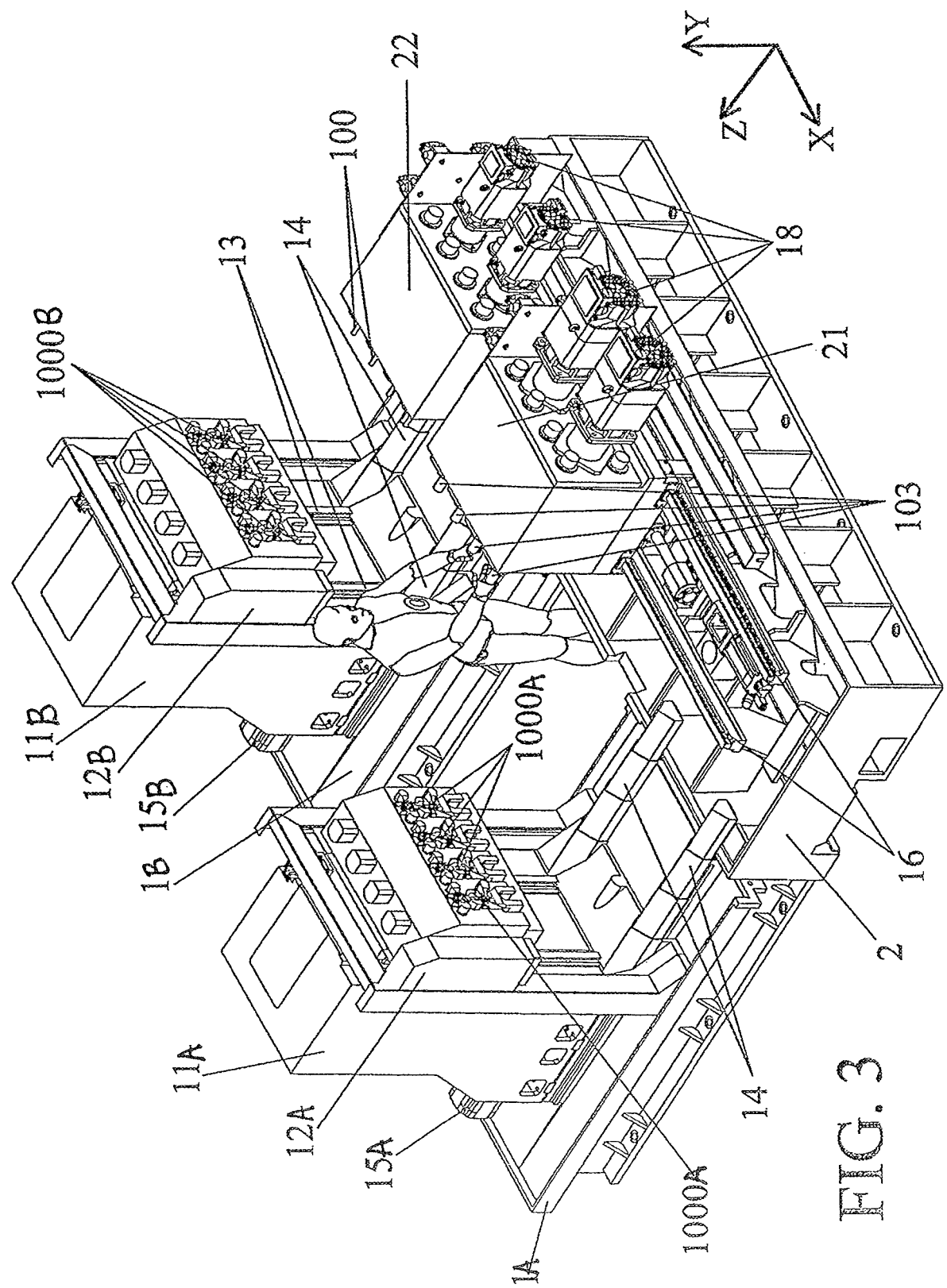
FIGS. 3-5 are schematic perspective views of a machine tool according to an embodiment of the invention.
Figure 4:
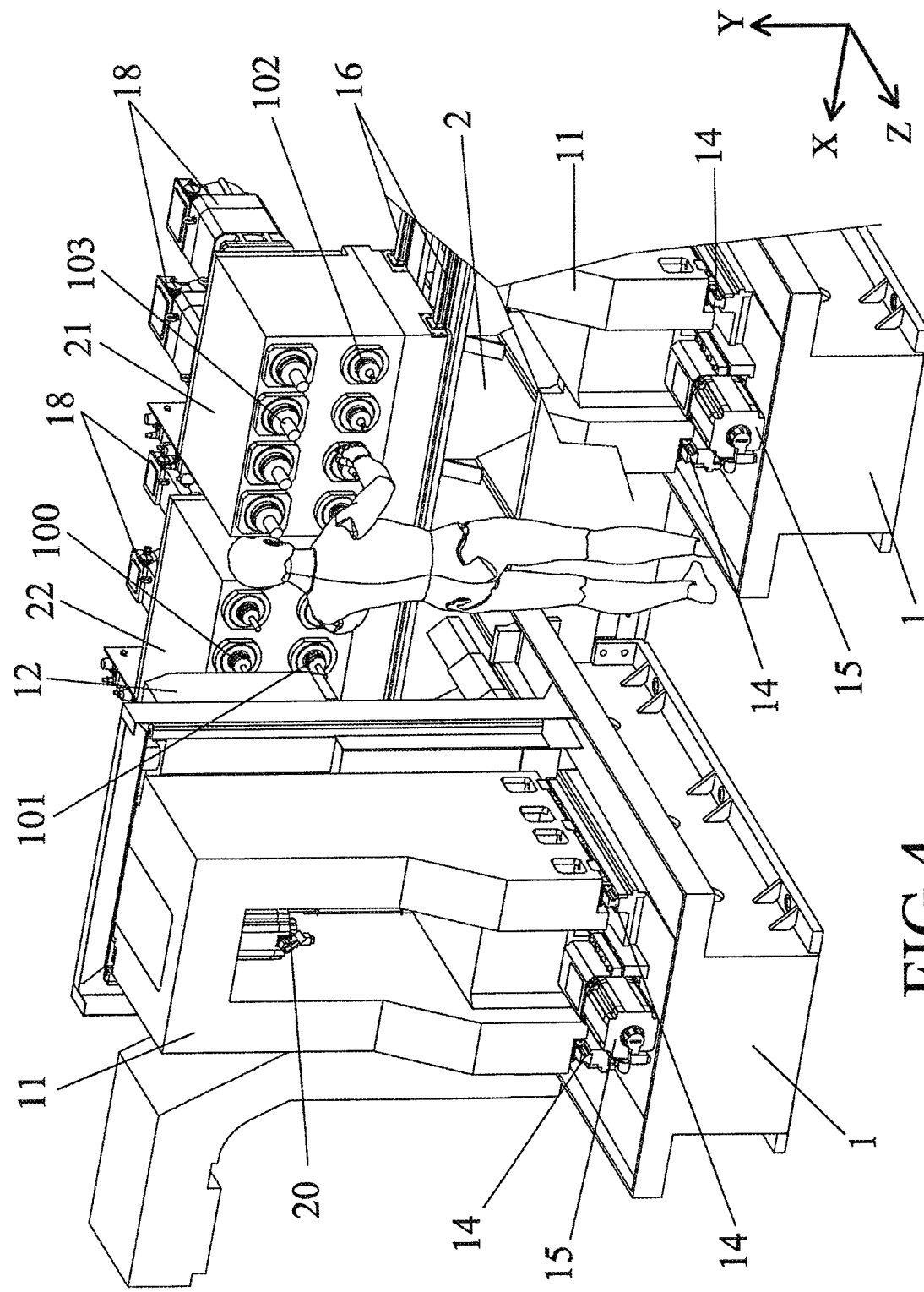
Figure 5:
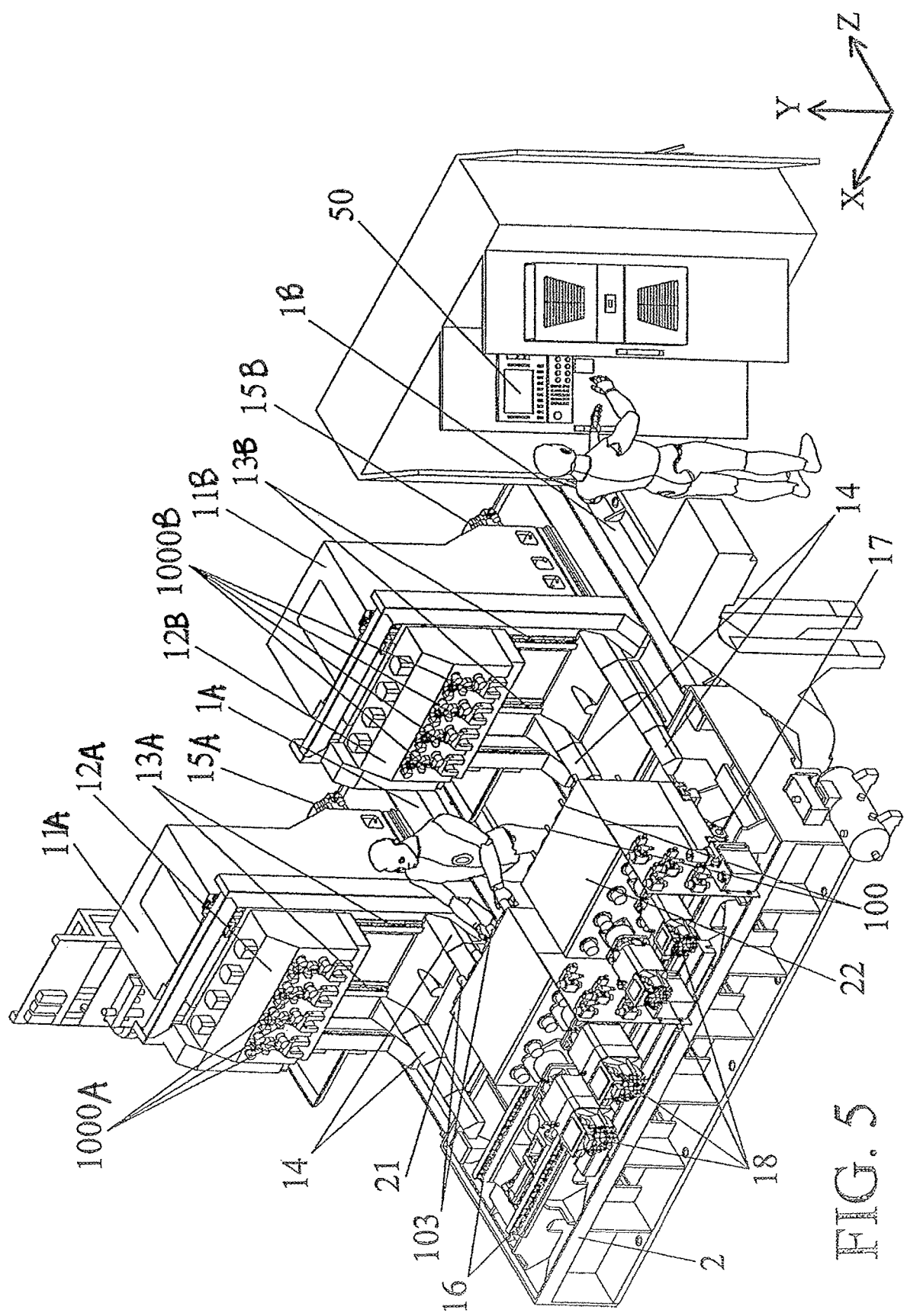

One possible embodiment of the invention, in accordance with the "U"-shaped layout of FIG. 2B, is shown in further detail in FIGS. 3-5. The machine tool comprises two workpiece carrier assemblies 11 on each of which a workpiece carrier 12 is mounted, so that it is displaceable in parallel with a vertical Y axis, along guide rails 13. This vertical movement of the work piece carrier along the guide rails 13 can be achieved by conventional means, such as by a servo motor drive system 20, which can be controlled by a computer 50 of the machine tool (schematically illustrated in FIG. 5). By means of the vertical movement, the workpiece carrier 12 can be positioned at a desired height for receiving workpieces from a supply device (not illustrated), for delivering machined workpieces, for positioning the workpieces at the right height for interaction with the tools for machining, and for displacing the workpieces vertically during machining.

Each workpiece carrier assembly 11 is a carriage designed for stability and rigidity so that the workpieces can be kept in their accurate position during interaction with the tools. Each carriage is supported on a respective workpiece carrier support 1, which includes horizontal rails 14 (cf. FIG. 4), extending along or in parallel with a horizontal Z axis. The workpiece carrier assembly or carriage is supported and guided by the guide rails for horizontal movement in parallel with said Z axis. The machine tool includes drive systems 15, such as servo motor drive systems, for displacing the workpiece carrier assemblies 11 along the guide rails 14, in a controlled manner, for example, controlled by the computer 50. By means of its horizontal movement, the workpiece carrier assemblies can, for example, be placed in a certain position for loading/unloading workpieces, be placed in a position for initiating machining (by interaction of the tools with the workpieces), and be displaced horizontally during machining, for displacing the workpieces with regard to the tools.

In this embodiment, each workpiece carrier assembly 11 or carriage rests on the respective workpiece carrier support 1, that is, it does not hang above it. This arrangement can thus help to improve stability, rigidity and can also facilitate installation of the machine tool, compared to installations with, for example, an overhanging quill. Rigidity may be especially important when the workpieces are, for example, blanks for connecting rods, as the tolerances are small while the structural rigidity of the blank is often relatively low.

The machine tool further includes two tool carriers 21 and 22, which are supported on a tool carrier support 2 extending along, or in parallel with, a horizontal X axis, which is perpendicular to the Z axis. The tool carrier support 2 is arranged at one of the ends of the workpiece carrier supports 1, which meet the tool carrier support 2 approximately at the respective ends of the tool carrier support 2, whereby the tool carrier support and the workpiece carrier support together form a "U" layout when viewed from above. The tool carrier support 2 includes on its upper surface two horizontal guide rails 16, on which the two tool carriers 21 and 22 are supported and along which they are guided in parallel with said X axis, controllably driven by a drive system 17, for example a servo motor drive system, operation of which can be controlled by the computer 50. The first tool carrier 21 is displaceable along the tool carrier support 2 between an operative position (in which it faces one of the workpiece carrier assemblies 11 and in which the tools mounted in the tool carrier can thus act on the workpiece blanks mounted in the workpiece carrier 12), and an inoperative position, in which it does not face the workpiece carrier assembly, but is laterally offset with regard to said workpiece carrier assembly. In FIGS. 3-5, the first tool carrier 21 is in the inoperative position. Thus, in this position, an operator can manipulate the tools, for example, inspect or replace the tools 102 and 103 mounted on the first tool carrier 21, without having the enter the space between the workpiece carrier assembly 11 and the tool carrier 21. Thus, as illustrated in FIGS. 3-5, manipulation of the tools is easy. It can be observed how the first tool carrier 21, when in the inoperative position, is at the central portion of the tool carrier support 2.

Also the second tool carrier 22 can be displaced between an operative position, in which it faces one of the workpiece carrier assemblies 11, and an inoperative position, laterally offset from said operative position. In FIGS. 3-5, the second tool carrier 22 is in the operative position (at the side or end portion of the tool carrier support 2).

Also the tool carriers 21 and 22 are designed for stability and rigidity, and they are stably supported on the tool carrier support 2.

The lateral displacement of the tool carriers 21, 22 in parallel with the X axis does not only serve to selectively bring the tool carriers into and out of the operative position, but also serves for positioning the tool carriers (and the tools) in the right position (along the X axis) for initiating machining, and for displacing the tool carriers (and, thus, the tools) along the X axis during machining.

The movement of tool carrier and workpiece carrier in the "X", "Y" and "Z" directions can be simultaneous. Simultaneous movement along more than one axis during machining can be helpful for performing certain operations.

Each tool carrier has, at a front end thereof, a plurality of rows of tools, for example two (2) rows of tools, each row comprising a plurality of tools, such as four (4) tools. For example, one tool carrier 21 can have one row of tools with a first kind of tool 103, and one row of tools with a second kind of tool 102, whereas the other tool carrier 22 can have one row of tools with a third kind of tool 100, and a second row of tools with a fourth kind of tool 101. For example, each row of tools can comprise four (4) tools of the same kind. The workpiece carrier can be arranged to support four (4) workpiece blanks 1000.

Thus, in this embodiment, sixteen tools of four different kinds are provided. In many embodiments, due to the fact that there are two tool carriers (and as the workpieces can be transferred from one workpiece support assembly to the other workpiece support assembly, and/or as a flexible layout as per FIG. 2C or similar can be used which allows each tool carrier assembly to be brought to the operative position in front of each workpiece carrier assembly, whenever desired), only two rows are needed to accommodate the 4×4=16 tools. If only one fixed tool carrier had been used, accommodating these tools while allowing interaction with one row of four (4) workpieces, would have required the use of four rows of tools, which would have increased the distance along which the tools would have to be arranged in the vertical direction. By means of an arrangement as per the invention, all of the tools can be placed within a very small vertical range, for example, the lowermost row of tools on the tool carriers can be arranged at a height of not less than 0.7 m, such as not less than 1.1 m, and not more than 1.8 m, such as not more than 1.5 m, over the floor or surface on which the operator will stand when manipulating the tools. In this way, the tools can be manipulated under ergonomically favourable conditions: the height at which the tools are placed makes manipulation comfortable, and as the tool carriers are laterally offset from the workpiece carrier 12 and the workpiece carrier assembly 11 when the tools are to be manipulated by the operator, the operator is not disturbed by the workpiece carrier 12 or the workpiece carrier assembly 11.

With this arrangement, several different operations can be carried out on the workpieces, such as connecting rod blanks, without changing the tools, by using the tools at different rows of the tool carriers, by shifting the workpieces from one workpiece carrier assembly to another and and/or, in some embodiments (such as the one of FIG. 2C), whenever necessary, by switching the tool carriers sideways, so that the tool carrier that was at its inoperative position enters the operative position, and vice-versa. Also, if further tools are needed, or if tools need to be replaced, this can be handled easily by an operator, for example, as illustrated in FIG. 3, by manipulating the tools of an inoperative tool carrier while the other tool carrier is operative (or not).

Also the height of the workpiece carrier support (1) and the tool carrier support (2) can be kept low, for example, at less than 1.1 m or at less than 0.6 m. In some embodiments of the invention, all guide rails can be kept at less than 1.1 m, 0.8 m, 0.7 m, 0.6 m or 0.5 m.

In the described embodiment, the absence of quills and similar overhanging structures can be advantageous, in terms of stability and in terms of simplicity of installation. In the described embodiment, both the workpiece carrier assemblies and the tool carriers are driven along and on top of fixed and stable supports. All the tools can be arranged at a height at which they can be manipulated by operators under ergonomically satisfactory conditions.

The tools can be driven by spindles motor 18, for example, via multiple spindle heads. This is conventional in the art and these drive mechanisms do thus not need to be discussed herein. Any suitable conventional or non-conventional kind of drive mechanism can be used. Also, the tool carriers can also be provided with cooling means, for example, with nozzles for ejecting a cooling liquid or fluid for cooling the tools and/or blank during operation. The tools can be arranged for rotation around an axis parallel to the Z axis.

Figure 6:
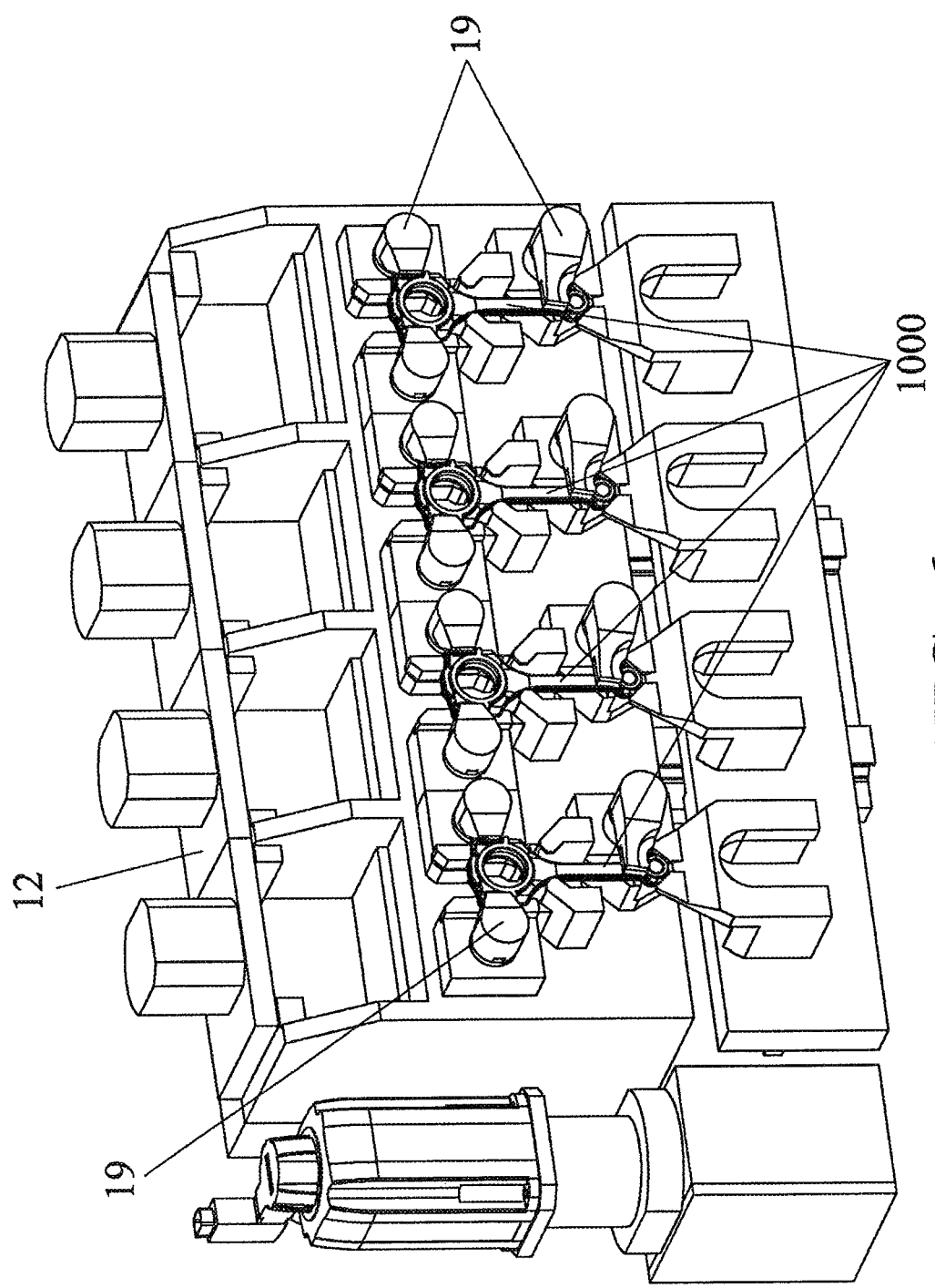
FIG. 6 is a schematic perspective view of a workpiece carrier that can be used in an embodiment of the invention.

Any kind of suitable workpiece carrier can be used. FIG. 6 just illustrates an example of one possible layout of a workpiece carrier, with hydraulically or pneumatically operated, pivotably arranged blocking elements 19 for blocking the workpieces 1000 in the correct position for machining.

LIST OF REFERENCE NUMBERS USED IN THE DESCRIPTION 1 workpiece carrier support
2 tool carrier support
11 workpiece carrier assembly
12 workpiece carrier
13 vertical guide rails on the workpiece carrier assembly for guiding the workpiece carrier during its vertical movement
14 horizontal guide rails of the workpiece carrier support, for guiding the workpiece carrier assembly during its horizontal movement
15 drive system for driving workpiece carrier assembly
16 horizontal guide rails for the tool carriers
17 drive system for driving the tool carriers
18 motor spindles
19 blocking elements
20 drive system for driving workpiece carrier
21, 22, 23 tool carriers
50 computer
100, 101, 102, 103 tools
1000 connecting rod (blank)
A operative position
B inoperative position In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A machine tool for machining connecting rods for a reciprocating piston engine, the machine tool comprising:
   at least two workpiece carrier assemblies (11A, 11B), each of the at least two workpiece carrier assemblies (11A, 11B) having a respective workpiece carrier (12A, 12B), each respective workpiece carrier (12A, 12B) supporting a respective plurality of connecting rod workpieces (1000A, 1000B);
   at least two workpiece carrier supports (1A, 1B), each of the at least two workpiece carrier supports (1A, 1B) supporting one of the at least two workpiece carrier assemblies (11A, 11B) for horizontal movement thereon in a first direction parallel with a horizontal Z axis;
   a first tool carrier (21) simultaneously carrying a first plurality of tools (102, 103) for simultaneously machining the respective plurality of connecting rod workpieces (1000A) supported by a first workpiece carrier (12A) of the respective workpiece carriers (12A, 12B) by rotating the first plurality of tools (102, 103) about respective axes parallel with the Z axis;
   a tool carrier support (2) supporting the first tool carrier (21) for horizontal movement in a second direction parallel with a horizontal X axis and perpendicular to the Z axis;
   the first tool carrier (21) being displaceable on the tool carrier support (2) with respect to the at least two workpiece carrier assemblies (11A, 11B) between an operative position (A) in which the first plurality of tools (102, 103) are capable of contacting the respective plurality of connecting rod workpieces (1000A) supported by the first workpiece carrier (12A) of the respective workpiece carriers (12A, 12B) and an inoperative position (B) in which the respective plurality of connecting rod workpieces (1000A) supported by the first workpiece carrier (12A) of the respective workpiece carriers (12A, 12B) are not contactable by the first plurality of tools (102, 103);
   a second tool carrier (22) simultaneously carrying a second plurality of tools (100, 101) for simultaneously machining the respective plurality of connecting rod workpieces (1000B) supported by a second workpiece carrier (12B) of the respective workpiece carriers (12A, 12B) by rotating the second plurality of tools (100, 101) about respective axes parallel with the Z axis,
   the tool carrier support (2) supporting the second tool carrier (22) for horizontal movement in the second direction, parallel with the horizontal axis X and perpendicular to the Z axis,
   the second tool carrier (22) being displaceable on the tool carrier support (2) with respect to the at least two workpiece carrier assemblies (11A, 11B), between an operative position (A) in which the second plurality of tools (100, 101) are capable of contacting the respective plurality of connecting rod workpieces (1000B) supported by the second workpiece carrier (12B) of the respective workpiece carriers (12A, 12B) and an inoperative position (B) in which the respective plurality of connecting rod workpieces (1000B) supported by the second workpiece carrier (12B) of the respective workpiece carriers (12A, 12B) are not contactable by the second plurality of tools (100, 101).

2. The machine tool according to claim 1, wherein the first tool carrier (21) is displaceable between the operative position (A) in which the first plurality of tools (102, 103) are capable of contacting the respective plurality of connecting rod workpieces (1000A) supported by the first workpiece carrier (12A) of the respective workpiece carriers (12A, 12B) and a second operative position (A) in which the first plurality of tools (102, 103) are capable of contacting the respective plurality of connecting rod workpieces (1000B) supported by the second workpiece carrier (12B) of the respective workpiece carriers (12A, 12B).

3. The machine tool according to claim 1, wherein the at least two workpiece carrier supports (11A, 11B) extend towards respective side portions of the tool carrier support (2), the tool carrier support (2) further comprising a central portion,
whereby the inoperative position (B) associated with the first tool carrier (21) and the inoperative position (B) associated the second tool carrier (22) each correspond to said central portion, and
wherein the operative position (A) associated with the first tool carrier (21) corresponds to one of the respective side portions, and the operative position (A) associated with the second tool carrier (22) corresponds to another one of the respective side portions.

4. The machine tool according to claim 1, wherein the at least two workpiece carrier supports (1A, 1B) and the tool carrier support (2), together have a U configuration or an F configuration, when viewed from above.

5. The machine tool according to claim 1, wherein each of the at least two workpiece carrier supports (1A, 1B) extends toward a respective intermediate portion of the tool carrier support (2), the tool carrier support (2) further comprising a central portion and two side portions, each of the two side portions being separated from the central portion by a corresponding one of the respective intermediate portions,
whereby the operative position (A) associated with the first tool carrier (21) corresponds to one of the respective intermediate portions, and the operative position (A) associated with the second tool carrier (22) corresponds to another one of the respective intermediate portions, and
wherein the inoperative position (B) associated with the first tool carrier (21) corresponds to the central portion or to one of the two side portions and the inoperative position (B) associated with the second tool carrier (22) corresponds to the central portion or to another one of the two side portions.

6. The machine tool according to claim 1, wherein the at least two workpiece carrier assemblies (11A, 11B) are at least three workpiece carrier assemblies (11A, 11B, 11C), the at least three workpiece carrier assemblies (11A, 11B, 11C) including the first workpiece carrier (12A), the second workpiece carrier (12B), and a third workpiece carrier (12C) for supporting a respective plurality of connecting rod workpieces (1000C), and
wherein the at least two workpiece carrier supports (1A, 1B) are at least three workpiece carrier supports (1A, 1B, 1C), each of the at least three workpiece carrier supports (1A, 1B, 1C) being supported for horizontal movement in said first direction.

7. The machine tool according to claim 6, further comprising a third tool carrier (23) displaceable in said second direction, between at least one operative position (A) and one inoperative position (B).

8. The machine tool according to claim 7, wherein the at least three workpiece carrier supports (1A, 1B, 1C) extend towards two side portions and one central portion of the tool carrier support (2), the tool carrier support (2) further comprising two intermediate portions, each of the two intermediate portions being positioned between said central portion and a respective one of said two side portions so that each of said side portions is separated from said central portion by one of said two intermediate portions,
whereby the inoperative position (B) associated with the first tool carrier (21) corresponds to one of said two intermediate portions, the inoperative position (B) associated with the third tool carrier (23) corresponds to another one of said two intermediate portions, and the inoperative position associated with the second tool carrier (22) corresponds to either of the one and the another one of the two intermediate portions, and
wherein the operative position (A) associated with the first tool carrier (21) corresponds to the central portion and to one of the two side portions, the operative position (A) associated with the third tool carrier (23) corresponds to the central portion and another one of the two side portions, and the operative position (A) associated with the second tool carrier (22) corresponds to the central portion.

9. The machine tool according to claim 6, wherein the at least three workpiece carrier supports (1A, 1B, 1C) and the tool carrier support (2) together have an E configuration, when viewed from above.

10. The machine tool according to claim 1, wherein each tool mounted in the first (21) or the second tool carrier (22) is placed at a height of not less than 0.7 m, and not more than 1.8 m, above a floor on which an operator walks when servicing the machine tool.

11. The machine tool according to claim 1, wherein the first tool carrier (21) comprises N rows of tools, where 1≤N≤5.

12. The machine tool according to claim 1, wherein each respective workpiece carrier (12A, 12B) is mounted on a corresponding one of the at least two workpiece carrier assemblies (11A 11B) so as to be displaceable in a vertical direction parallel with a Y axis.

13. The machine tool according to claim 1, wherein the at least two workpiece carrier supports (1A, 1B) and the tool carrier support (2) are on a floor thereby supporting the at least two workpiece carrier assemblies (11A 11B) and the first (21) and second (22) tool carriers from below.

14. The machine tool according to claim 1, wherein the at least two workpiece carrier supports (1A, 1B) and the tool carrier support (2) have a height of not more than 1.1 m.

15. The machine tool according to claim 1, wherein the respective plurality of connecting rod workpieces (1000A) supported by the first workpiece carrier (12A) of the respective workpiece carriers (12A, 12B) are 4 to 8 workpieces, and the respective plurality of connecting rod workpieces (1000B) supported by the second workpiece carrier (12B) of the respective workpiece carriers (12A, 12B) are 4 to 8 workpieces.

16. The machine tool according to claim 1, wherein when either the first (21) or the second tool carrier (22) is in the associated inoperative position, none of the plurality of tools (100, 101, 103, 102) carried by the respective first (21) or the second tool carrier (22) in the inoperative position aligns for engagement with the respective plurality of connecting rod workpieces (1000A) carried by the first workpiece carrier (12A) of the respective workpiece carriers (12A, 12B) or the respective plurality of connecting rod workpieces (1000B)

carried by the second workpiece carrier (12B) of the respective workpiece carriers (12A, 12B).

\* \* \* \* \*